Figure 1:
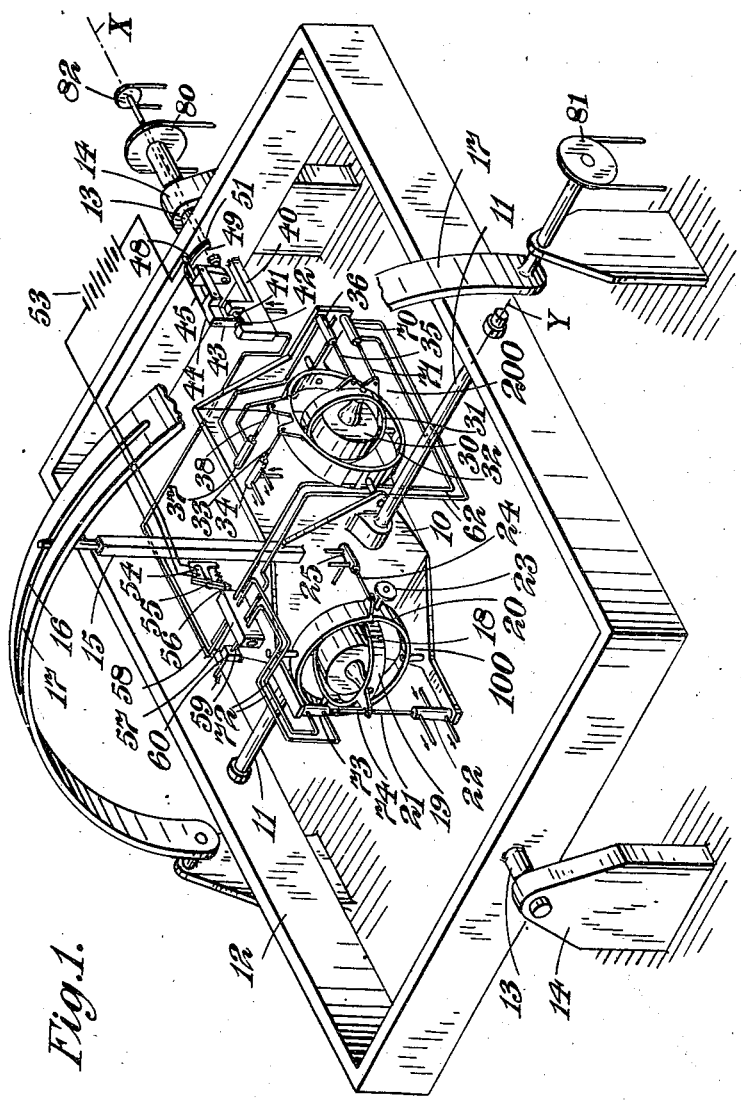

June 16, 1942.   F. W. MEREDITH   2,286,561
AUTOMATIC CONTROL APPARATUS FOR AIRCRAFT
Filed July 7, 1939   3 Sheets-Sheet 1

Frederick W. Meredith
By
Watson, Cole, Grindle & Watson
Attys.

June 16, 1942.    F. W. MEREDITH    2,286,561
AUTOMATIC CONTROL APPARATUS FOR AIRCRAFT
Filed July 7, 1939    3 Sheets-Sheet 2
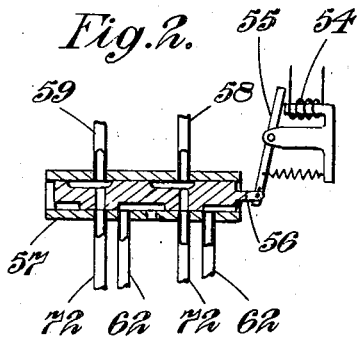
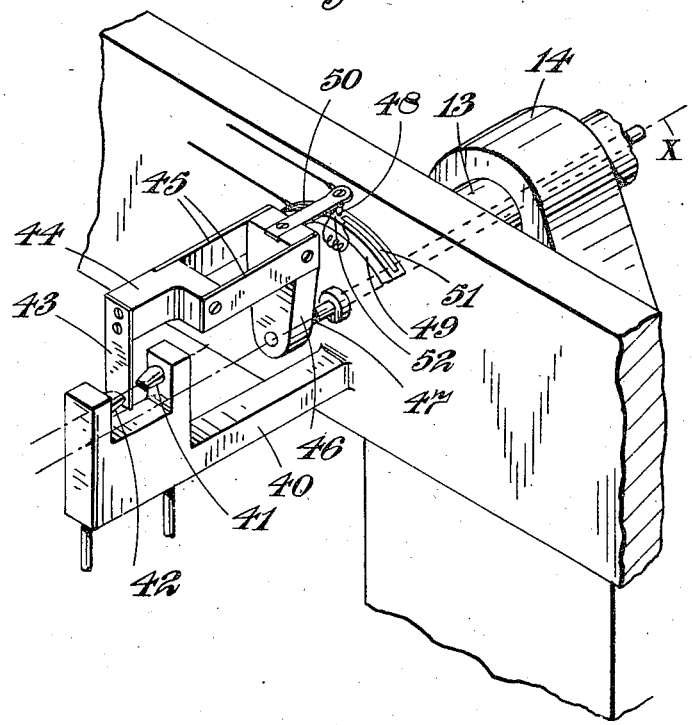
Frederick W. Meredith
By
Watson, Cole, Grindle & Watson
Attys.

June 16, 1942.　　F. W. MEREDITH　　2,286,561
AUTOMATIC CONTROL APPARATUS FOR AIRCRAFT
Filed July 7, 1939　　　3 Sheets-Sheet 3

Patented June 16, 1942

2,286,561

UNITED STATES PATENT OFFICE 2,286,561

AUTOMATIC CONTROL APPARATUS FOR AIRCRAFT

Frederick William Meredith, London, England, assignor to S. Smith & Sons (Motor Accessories) Limited, London, England, a British company Application July 7, 1939, Serial No. 283,313
In Great Britain July 13, 1938

8 Claims. (Cl. 244—79)

This invention relates to automatic control apparatus, for aircraft, of the kind in which a gyroscope with its rotor axis inclined to the vertical (e. g. horizontal) is arranged to control the bank or pitch of the craft.

If a rotating body (for example, the rotor of a gyroscope) is subjected to a torque about any axis, this torque may be resolved into two components; one component about the axis of rotation and the other about an axis normal to the axis of rotation. The first component merely alters the speed of rotation of the body and the second component causes precession of the axis of rotation about an instantaneous axis (hereinafter termed the "axis of precession") normal both to the axis about which the said second component operates and to the axis of rotation. The said second component of torque is therefore referred to hereinafter as the "precessing torque." Thus, the axis of rotation, the axis of precession and the axis about which the precessing torque operates, together form an orthogonal system.

In apparatus of the kind described, it is necessary to precess the gyroscope when the aircraft changes course so as to maintain the azimuthal configuration of the rotor axis with respect to the craft when the heading of the craft is altered. It is desirable that the axis of precession and the rotor axis should lie in the same vertical plane, as otherwise the inclination of the rotor axis to the vertical will vary and the bank or pitch datum will be changed. This necessitates the application of the precessing torque about a horizontal axis, and for this purpose it is known to provide means for applying a precessing torque about an axis fixed in the craft. The torque axis, however, may not remain horizontal if the craft is not flying level and the object of the present invention is to overcome this difficulty and so enable the craft to be turned while banked or pitched.

In addition to the said gyroscopic control apparatus, it is usual to provide additional apparatus (which may or may not also be gyroscopically controlled) for automatically controlling the craft about a second horizontal axis. That is to say, if the gyroscopic control apparatus controls the craft in pitch the additional apparatus controls it in roll and vice versa.

According to the primary feature of the present invention there is provided a control apparatus for aircraft comprising a gyroscopic device in which the rotor axis is normally inclined to the vertical, e. g. horizontal for controlling the aircraft about a horizontal axis, precessing means for applying a torque to the gyroscopic device about said horizontal axis, means automatically controlling the aircraft about a second horizontal axis and having a part rotatable through a distance corresponding to the angle of movement of the aircraft about said second horizontal axis and a coupling connecting said part to the said precessing means to rotate the precessing means through the said angle so as to maintain the torque axis substantially horizontal. If the said part rotates through the said angle the gyroscopic device may conveniently be mounted on this part so as to rotate therewith.

In one form of the invention the means for controlling the aircraft about the second horizontal axis comprises a second gyroscopic device having its rotor axis inclined to the vertical and the two gyroscopic devices are mounted together on a common platform which is supported in the aircraft for movement about the two said horizontal axes or axes parallel thereto. Thus, rotation of the platform about either of these axes causes the appropriate gyroscope to rotate the craft about that axis through a corresponding angle and at the same time rotates the other gyroscope, and with it its precessing means relative to the craft through the same angle so as to maintain the precessing torque axis horizontal. The primary feature of the invention, as aforesaid, is thus applied to both gyroscopes.

According to a further feature of the invention, whereby substantially correctly banked turns at the assigned angle of bank may be attained, one of said gyroscopic devices also controls the rudder of the aircraft and means, operative when the aircraft is intentionally banked, is provided sensitive to lateral acceleration or side-slip for controlling the precessing torque applied to this gyroscope so as to adjust the rudder to reduce the lateral acceleration or side-slip. By lateral acceleration is meant the component of the total acceleration field (as measured for example by accelerometers) in the direction of the lateral axis of the craft.

Yet another feature consists in providing means controlled by rotation of the said platform about one of said axes or an axis parallel thereto for bank control of the craft, for diverting the control provided by said means, sensitive to said lateral acceleration or side-slip to means for precessing the gyroscope for bank control to effect bank trimming of the aircraft when the said platform is not displaced.

Figure 4:
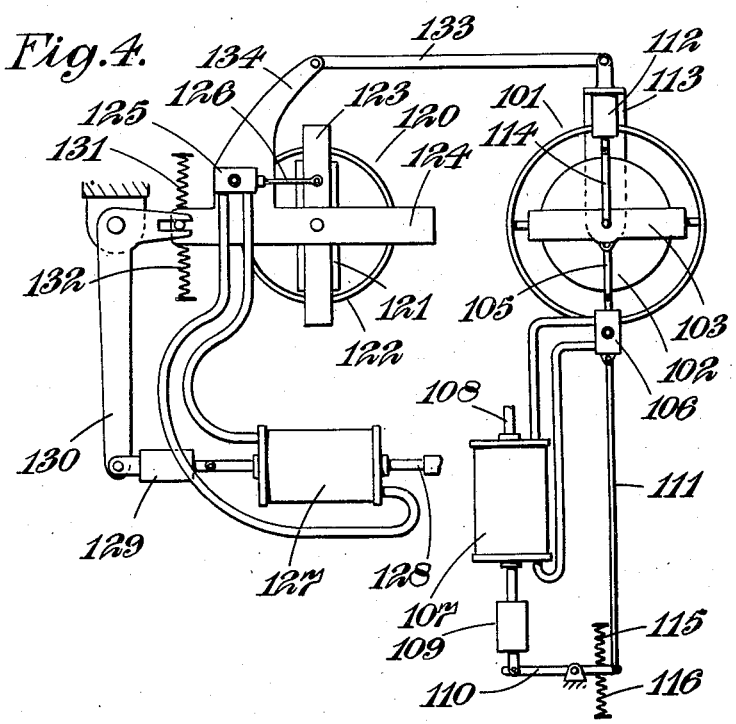

One form of control apparatus according to the invention is shown diagrammatically and by way of example in the accompanying drawings, in which:

Figure 1 is a general view of the apparatus;
Figures 2 and 3 are detail views; and
Figure 4 shows a modified control apparatus.

Referring to the drawings, a platform 10 is pivotally mounted by spigots 11 in a frame 12 for rotation about a normally horizontal axis Y. The frame 12 is rotatably mounted by means of spigots 13 located in bearings 14 fixed in the aircraft such that the axis X, about which the frame 12 can turn, is horizontal and lengthwise of the craft. The platform 10 is guided for movement about the axis Y by a column 15 engaging in a slot 16 in an arcuate guide 17 pivoted about an axis which coincides with the Y axis when the frame 12 is in the horizontal position.

The platform 10 carries a gyroscope 100 for controlling the craft in pitch, this gyroscope comprising a rotor 18 whose axis of spin is horizontal and lies fore-and-aft of the craft. The rotor 18 is carried in bearings in a gimbal ring 19 arranged horizontally and in turn pivotally mounted in an outer gimbal ring 20 which is rotatable about a vertical axis on the platform 10. The inner gimbal ring 19 is connected by a link 21 to a valve 22 which controls a supply of air under pressure to a servomotor, not shown, for adjusting the elevator of the aircraft in known manner, the link permitting the necessary movement about the pivotal mounting of the outer gimbal ring 20. The outer gimbal ring 20 is unbalanced by a weight 23 and it is connected by a link 24 to a valve 25 controlling a supply of air under pressure to a servo-motor, not shown, for operating the rudder in known manner.

Also mounted on the platform 10 is a gyroscope 200 for controlling the ailerons of the aircraft. This gyroscope comprises a rotor 30 whose axis of spin is horizontal and lies transversely of the aircraft. The rotor is carried in bearings in an inner gimbal ring 31, the plane of which also lies transversely of the aircraft and this inner gimbal ring is pivotally mounted in an outer gimbal ring 32 which is pivoted for movement about a fore-and-aft horizontal axis on the platform 10. The outer gimbal ring 32 is connected by a link 33 to a valve 34 controlling the supply of air under pressure to a servo-motor, not shown, for operating the ailerons of the aircraft. The inner gimbal ring 31 is connected by a link 35 to a detecting valve 36 for controlling the air supply to a precessing motor 37 mounted on the platform 10. This motor operates on the outer gimbal ring 32 through a link 38.

On the frame 12 there is a bracket 40 carrying a delivery nozzle 41 for air under pressure and opposite to it a receiving nozzle 42. A blade 43 movable between these nozzles controls the air pressure in the conduit leading from the nozzle 42. The blade 43 is mounted on a weight 44 which is carried by means of springs 45 connected to a member 46 is mounted on a spindle 47 rotatable in the frame 12 about the X axis. The member 46 also carries an electric contact brush 48 co-operating with a commutator 49 on the frame 12, this frame having interconnected contacts 50 and 51 separated by an insulating section 52. The brush 48 normally rests on this insulating section.

The brush 48 is connected through a battery indicated at 53 to one terminal of an electromagnet 54 of which the other terminal is connected to the contacts 50 and 51. An armature 55 controlled by the magnet 54 is connected to the spindle 56 of a change-over valve 57.

The valve 57 has an inlet 58 which is connected to the nozzle 42 and another inlet 59 to which air under pressure is applied through a reducing valve 60. According to the position of the blade 43 between the nozzles 41 and 42, the air pressure applied from the nozzle 42 to the valve varies within a range extending above and below the pressure applied at the inlet 59. The valve has outlets 62 leading to a bank trimming motor 70 carried on the platform 10 and having an operating link 71 connected to the inner gimbal ring 31 of the gyroscope 200. The valve has other outlets 72 leading to an azimuth precessing motor 73 having an operating link 74 connected to the inner gimbal ring 19 of the rudder and elevator gyroscope 100, the link permitting the necessary movement about the pivotal mounting of the outer gimbal ring 20. In the energised position of the magnet 54 the movable element 63 of the valve is in such position as to connect the inlets 58 and 59 to the precessing motor 73 and in the de-energised position the trimming motor 70. The blade 43 has one edge normally lying across the centre of the nozzle 41, so that the difference in pressure at the inlets 58 and 59 of the valve has a zero value at the normal position and an increasing value upon relative movement of the blade and the nozzles and depending in sign upon the direction of this relative movement.

By means of the apparatus according to this invention the control of the aircraft in pitch and roll is effected by means such as the pulley and cable 80 for turning the platform about the X axis, and another pulley and cable 81 for turning the platform about the Y axis. By rotation of the platform 10 about the Y axis it is displaced from its horizontal position in the aircraft so as to produce by means of the gyroscope 100 a corresponding change in the elevational direction of the aircraft. Similarly, by rotation of the platform 10 about the X axis, displacing it from the horizontal position in the aircraft, there is produced a control of the aircraft in bank.

By turning the frame about the X axis, the relative displacement of the platform 10 and the outer gimbal ring 32 of the gyroscopic device 200 operates the valve 34 for producing an adjustment of the ailerons to bring the platform 10 back to the normal horizontal position by banking the aircraft. This banking of the aircraft produces side-slip which is detected by the weight 44 displacing the blade 43 with respect to the nozzles 41 and 42. The air pressure in the conduit 58 leading from the nozzle 42 will thus be increased or decreased as the case may be. Since the frame 12 has been turned in the aircraft the circuit of the magnet 54 is energised through the brush 48 and one of the contacts 50, 51, so that the valve 57 applies the air pressures at the inlets 58 and 59 to the azimuth precessing motor 73. The motor transmits a torque to the inner gimbal ring 19, causing the rotor to precess. The resulting precessional movement of the outer gimbal ring 20 operates the valve 25 to energise the servomotor for moving the rudder to turn the aircraft in such a sense as to limit the side-slip causing the said displacement of the blade 43.

Thus, the weight 44, its associate jets 41 and 42 and the azimuth precessing motor 73 together form a governor to control the extent of side-slip. In the operation of the apparatus as thus far described, there will be a side-slip associated with any turn and proportional to the rate of the turn. To reduce this error, as shown in Figure 3, the line of the jets 41 and 42 is displaced above the axis of rotation of the frame 12, so that when the frame 12 is inclined about its axis X, to initiate a turn, the jets are displaced relative to the blade 43 even though the side-slip is zero.

In straight flight the contact 48 is open and the pressure difference in the conduits 58 and 59 is applied to the bank trimming motor 70 for the purpose of ensuring correct levelling of the platform 10 about the axis X. Thus, if the platform 10 is slightly tilted about the X axis, the blade 43 is displaced relative to its associated jets and the pressure in the conduit 58 is no longer equal to pressure in the conduit 59 and so that the motor 70 applies a torque to the inner gimbal ring 31, so as to precess the outer gimbal ring 32 to change the attitude of the craft until the platform 10 is correctly levelled about the X axis.

By adjustment of the pitch control 81 the platform 10 is displaced relative to the gyroscope 100 about the axis of the inner gimbal ring and the consequential relative movement of this inner gimbal ring and the platform 10 controls the valve to produce a movement of the elevators to tilt the craft so that the platform is returned to the horizontal position. If, however, the platform 10 is slightly tilted about the Y axis the weight 23 applies a torque to the outer gimbal ring 20 which precesses the inner gimbal ring 19 thus changing the attitude of the craft until the platform is correctly levelled about the Y axis.

It will thus be appreciated that the platform 10 on which the gyroscopic devices are mounted is always returned to the horizontal position regardless of the trim of the aircraft so that in the case of each gyroscope the axis of precession during a turn is maintained vertical and thus lies in the same vertical plane as the rotor axis.

The bracket 46 which carries the electric contact brush 48 is mounted on a spindle 47 which is normally fixed with respect to the frame 12. It may, however, be rotated through a pulley 82 and cable for producing a flat turn of the aircraft, in which case the pulley 80 is held fixed.

In other respects the gyroscopes 100 and 200 perform their well known functions, operating in the known manner for the control of the rudder and elevators, and the control of the ailerons respectively, for instance, as described in Great Britain Patent No. 365,186 and United States Patent No. 1,992,086.

It will be understood that known means may be employed to provide a follow-up from each servomotor to its associated valve, although for clarity such follow-up means are omitted in Figures 1 to 3.

In Figures 1 to 3, the rudder gyroscope controls the elevators, but the modifications necessary when the rudder gyroscope controls the ailerons will be obvious from the above description.

In the modified arrangement diagrammatically shown in Figure 4, a gyroscope 101 for controlling the craft in pitch has its rotor 102 arranged with the axis of spin horizontal and fore-and-aft of the craft. The rotor is mounted in bearings in an inner gimbal ring 103 arranged horizontally and in turn pivotally mounted in an outer gimbal ring 104 rotatable about a vertical axis. The inner gimbal ring 103 is connected by a link 105 to a valve 106 controlling a supply of air under pressure to a servomotor 107 containing a double-acting piston, of which the piston rod 108 is connected to the elevators. A follow-up is provided through a fluid coupling 109 connected to one arm of a lever 110, the other arm of which is connected through a link 111 to the cylinder of the valve 106. Centering springs 115 and 116 are provided for the follow-up mechanism. An azimuth precessing motor 112 mounted on a plate 113, which is rotatably mounted for movement in a vertical plane, operates on the gimbal ring 103 through a link 114. Air under pressure is applied to this motor under the control of means (not shown) for detecting precession of the outer gimbal ring 104 due to movements of the craft in pitch, so as to maintain the azimuthal configuration of the rotor axis with respect to the craft.

Another gyroscope 120 for controlling the ailerons of the aircraft comprises a rotor 121 whose axis of spin is horizontal and lies transversely of the aircraft. This rotor is carried in bearings in an inner gimbal ring 122, which is rotatable about a vertical axis in an outer gimbal ring 123. The outer gimbal ring 123 is pivotally mounted about the roll axis in a follow-up frame 124 also pivoted about the roll axis. The follow-up frame carries a piston valve 125, of which the piston is connected by a link 126 to the outer gimbal ring 123. The valve 125 controls a supply of air under pressure to a servomotor 127 containing a double-acting piston, of which the piston rod 128 is connected to the ailerons. A follow-up is provided through a viscous coupling 129 connected to the piston rod and one arm of a lever 130, the other arm of which is connected to the follow-up frame 124. Centering springs 131 and 132 are provided for the follow-up frame. By means of this gyroscope, movement of the craft in roll causes relative movement between the outer gimbal ring 123 and the follow-up frame 124, thus operating the valve 125 to move the ailerons to oppose the roll.

For the purpose of this invention the follow-up frame 124 is coupled to the precessing motor 112 so that the latter rotates through the same angle as the follow-up frame. Thus, the follow-up frame 124 has an extension 134 connected by a link 133 to the plate 113 carrying the precessing motor 112, so that rotation of the follow-up frame of the gyroscope 120 through any angle produces a rotation of the precessing motor 112 through the same angle. Thus, should the aircraft be flying in a banked attitude, the consequential displacement of the follow-up frame 124 produces a corresponding displacement of the precessing motor 112 which in turn rotates the inner gimbal ring of the gyroscope 101 to maintain the axis about which the precessing torque operates, substantially horizontal.

I claim:

1. A control apparatus for aircraft, comprising a gyroscopic device having the rotor axis normally inclined to the vertical, means operated by said gyroscopic device for controlling the aircraft about a horizontal axis, precessing means for applying a torque to said gyroscopic device about said horizontal axis, said precessing means being rotatable about a second horizontal axis inclined to the first said horizontal axis, means automatically controlling the aircraft about said second horizontal axis and having a part rotatable through a distance corresponding to the angle of movement of the aircraft about said second horizontal axis and a coupling connecting said part to the said precessing means to rotate the precessing means through the said angle so as to maintain the axis about which said torque is applied substantially horizontal.

2. A control apparatus for aircraft comprising a gyroscope control device having the rotor axis inclined to the vertical, means operated by said gyroscope control device for controlling the attitude of the aircraft about one horizontal axis, precessing means for applying a torque to said gyroscope about said horizontal axis when the craft is being turned, a second control device for controlling the attitude of the aircraft about a second horizontal axis, displacing means for the datum of the second control device and means coupling said displacing means to said precessing means for the purpose of maintaining the attitude of said precessing means about said second axis when said datum is altered.

3. A control apparatus for aircraft as claimed in claim 1, wherein the said part and said precessing means are mounted on a common rotatable member.

4. A control apparatus for aircraft as claimed in claim 2, wherein the coupling comprises a rotatable member carrying both control devices.

5. A control apparatus for aircraft comprising a gyroscope control device having the rotor axis inclined to the vertical, means operated by said gyroscope control device for controlling the attitude of the aircraft about one horizontal axis, precessing means for applying a torque to said gyroscope about said horizontal axis when the craft is being turned, a second gyroscope control device, means operated by said second gyroscope control device for controlling the attitude of the craft about a second horizontal axis, and a common supporting member on which both gyroscope control devices are mounted, which supporting member is mounted for movement in the aircraft about axes parallel to said horizontal axes and which supporting member serves to transmit a displacement of the datum of said second control device to the said precessing means of the first said control device to maintain the attitude of the said precessing means about the second horizontal axis when said datum is altered.

6. A control apparatus for aircraft comprising a gyroscopic device having the rotor axis normally inclined to the vertical, means operated by said gyroscopic device for controlling the aircraft about a horizontal axis, precessing means for applying a torque to said gyroscopic device about said horizontal axis, a second gyroscopic device having the rotor axis normally inclined to the vertical, means operated by said second gyroscopic device for controlling the aircraft about a second horizontal axis, precessing means for applying a torque to said second gyroscopic device about said second horizontal axis, and a common supporting member on which both said gyroscopic devices and both said precessing means are mounted, which supporting member is mounted for movement in the aircraft about axes parallel with said horizontal axes, and is moved relatively to the aircraft about a said horizontal axis as a result of change of datum of a said gyroscope to maintain a given attitude of the precessing means of the other gyroscope.

7. A control apparatus for aircraft comprising a gyroscopic device having the rotor axis normally inclined to the vertical, means operated by said gyroscopic device for controlling the aircraft about a horizontal axis, precessing means for applying a torque to said gyroscopic device about said horizontal axis, a second gyroscopic device having the rotor axis normally inclined to the vertical, means operated by said second gyroscopic device for controlling the aircraft about a second horizontal axis, precessing means for applying a torque to said second gyroscopic device about said second horizontal axis, and a common supporting member on which both said gyroscopic devices and both said precessing means are mounted, which supporting member is mounted for movement in the aircraft about axes parallel with said horizontal axes, and is moved relatively to the aircraft about a said horizontal axis as a result of change of datum of a said gyroscope to maintain a given attitude of the precessing means of the other gyroscope, means controlled by one of said gyroscopic devices for operating the rudder of the aircraft, and means responsive to lateral acceleration or side-slip to control the precessing torque applied to this gyroscopic device so as to adjust the rudder to reduce the lateral acceleration or side-slip.

8. A control apparatus for aircraft comprising a gyroscopic device having the rotor axis normally inclined to the vertical, means operated by said gyroscopic device for controlling the aircraft in bank about a horizontal axis, precessing means for applying a torque to said gyroscopic device about said horizontal axis, a second gyroscopic device having the rotor axis normally inclined to the vertical, means operated by said second gyroscopic device for controlling the aircraft in pitch about a second horizontal axis, precessing means for applying a torque to said second gyroscopic device about said second horizontal axis, and a supporting member on which both said gyroscopic devices and both said precessing means are mounted, which supporting member is mounted for movement in the aircraft about axes parallel with said horizontal axes, means operated by one of said gyroscopic devices for operating the rudder of the aircraft, means responsive to lateral acceleration or side-slip to control the precessing torque applied to this gyroscopic device so as to adjust the rudder to reduce the lateral acceleration or side-slip, means controlled by the rotation of said supporting member about an axis parallel to first said horizontal axis, to divert the control provided by said means sensitive to lateral acceleration or side-slip from the precessing means for controlling the rudder to said precessing means for first said gyroscope, for bank trimming of the aircraft.

FREDERICK WILLIAM MEREDITH.